Patented Jan. 7, 1936

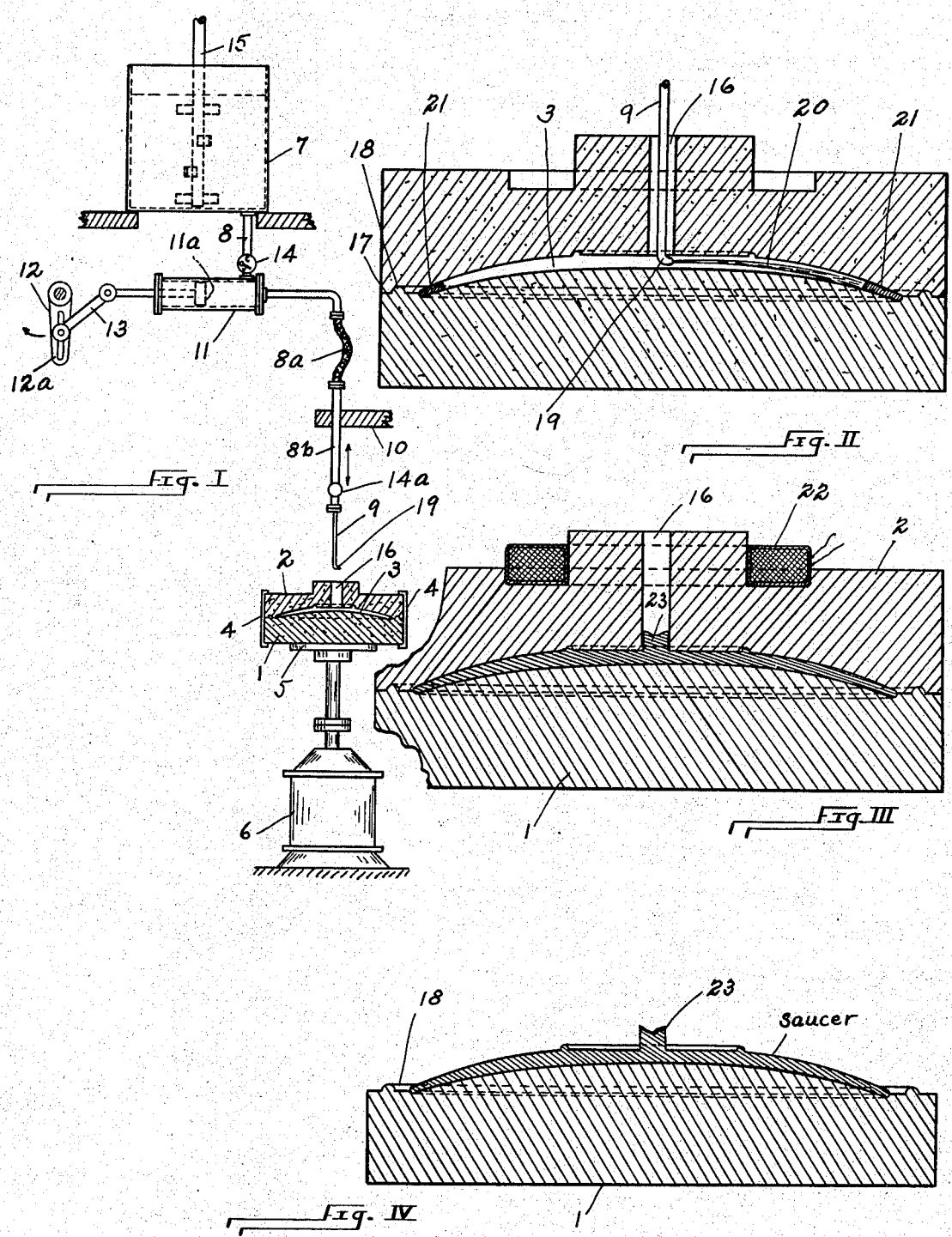

2,026,624

UNITED STATES PATENT OFFICE 2,026,624

MANUFACTURE OF EARTHENWARE

Wesley B. Flower, East Liverpool, Ohio

Application October 16, 1934, Serial No. 748,465

16 Claims. (Cl. 25—29)

My invention relates to the production of earthenware, and is found both in method and in apparatus.

In the manufacture of earthenware, a wet, plastic mixture of clay and other well-known ingredients is fashioned into the form of the desired ware, and then it is dried and fired. In the case of some wares, such as dinner ware, the fired articles are further treated and fired, to provide them with a highly glazed finish. Ordinarily, the "green" clay mixture is fashioned by casting, or by "spinning" it on a mechanically driven potter's wheel. The potter's wheel carries a rotating, open mold upon which the plastic clay is spread. The mold shapes the inner face of the article being formed, while a steel "profile" is employed to form the outer face. As practiced hitherto, the casting process is relatively slow and costly, and, for this reason and others, the wheel has been used whenever possible. The potter's wheel requires the services of a skilled workman, and, as frequently is the case in processes dependent upon manual skill, the product lacks precise uniformity.

More specifically, my invention is directed to improvements in method of and apparatus for casting earthenware, whereby ceramic articles, which in the past have been formed on the potter's wheel, may advantageously be produced by casting. I aim to provide a method of casting or molding pottery which lends itself to mass production—a method in which less skill is required and in which ware of more uniform and better quality is produced. Economy is another thing I have in mind. And still other objects will present themselves in the following specification.

The invention has been particularly developed for the manufacture of ceramic tableware, and I shall describe the invention as it may be practiced in this specific field.

In the accompanying drawing, Fig. I is a diagrammatic view, showing partly in side elevation and partly in vertical section apparatus in which and in the operation of which my invention may be realized. Fig. II is a view to larger scale, showing the mold of the apparatus in vertical section, and illustrating the charging of the mold cavity. Fig. III is a view comparable with Fig. II, showing the mold cavity filled. And Fig. IV is a view in vertical section, showing the base or drag of the mold, and the molded article resting thereon for further treatment.

Referring to the drawing, the apparatus in exemplary way is shown as including a mold having a plurality of body portions—in this case a drag 1 and a cope 2. Removable clamps 4, or other suitable means, serve to secure the mold sections together, and in service the assembled mold is secured upon a bed-plate 5, adapted to be rotated upon a vertical axis, say by means of a motor 6. A container 7 is provided for a supply of the fluid ceramic mixture to be cast or molded, and means are provided for feeding the material from the supply into the rotating mold. Advantageously, such means comprise a conduit 8, extending from the container to a point immediately above the mold; a discharge nozzle 9 (presently to be more fully described) is secured to the terminal of conduit 8, and an insert 8a of flexible hose in the conduit permits the terminal portion 8b of the conduit to be moved vertically in a guide 10, whereby the outlet of the nozzle 9 may be inserted in the mold cavity 3 and removed.

With the conduit 8, I organize a pump 11, and the plunger 11a of the pump is reciprocated by means of a crank 12. In well-known manner a motor and suitable reduction gearing (not shown) are arranged to drive the crank slowly. The movement of the plunger 11a is subject to the instantaneous control of the attendant—it may be quickly started and stopped. As the engineer will know, an electrical control device, or a clutch installed in the connections between the driving motor and the crank, may serve to this end. During the intake stroke of the plunger the ceramic mixture is drawn through a check-valve 14 into the pump, and, during the discharge stroke, the check-valve being closed, the fluid mixture is forced under pressure through the conduit (8a, 8b) and the nozzle 9. The proportions of the parts are so determined that one stroke of the plunger is instrumental in feeding the right amount of material for each mold. Thus, the pump 11 serves as a measuring device as well as a positive feeder. It is important to note that the effective throw of the crank 12 may be varied, whereby the stroke of the plunger (and in consequence, the volume of material discharged) may be regulated as need be. I have shown a slot 12a in the crank arm, and the distal end of the connecting rod 13 may be pivotally secured to the arm at any point longitudinally of the slot, to obtain such variation in throw.

If desired, a check valve 14a may be arranged in the feed line, to prevent unintended escape of material from the nozzle while the pump 11 is at rest.

The motor 6 may be readily started and stopped; the mold 1, 2 may be readily installed upon the platen 5, and its rotation at high speed quickly established; the discharge nozzle 9 may in an instant be inserted in the mold, and, by means of instrumentalities already mentioned, the mold may be quickly charged. It will be understood that a supply of empty molds 1, 2 may be advanaced upon an endless conveyor (not shown), and introduced one after another in quick succession into the molding apparatus. And, upon being charged, the molds may be quickly removed from the apparatus, and placed upon a conveyor, leading to the usual drying room.

Turning to a more minute consideration of my method, I shall describe the preparation of the ceramic mixture employed.

It will be understood that various grades of clay and other materials are used in the production of various grades of pottery and chinaware. Save as hereinafter mentioned, the invention is not primarily concerned with grade or mixes of the ceramic materials. That is to say, given a known mixture of ceramic materials, I so process it and mold it as to produce a known grade of ware more economically and with greater perfection and uniformity in individual pieces. Going into a pottery plant, I take the "green" ceramic mixture being used, that is, the ceramic mixture as it is already prepared in plastic state for use on the potter's wheel, and to such mixture I add in approximately equal proportions silicate of soda and soda ash. These alkaline reagents are dissolved in water, preparatory to their introduction to the clay, and the total amount introduced to the mix may be from .2 to .3 percentum by weight. Water is added to the already moist but plastic mass, and the mixture is stirred or blunged. The quantity of water added is relatively small, being merely enough to give the mixture such fluidity that it may be poured. The specific gravity of the mixture should be about 1.8.

A fluid mixture of this sort is known as "casting slip." Hereinafter, the word "slip" shall be used to denote casting material, and, hereinafter, the quantity of liquid (water) added to the liquid already present in the plastic or semirigid mass, to produce the "slip," will be termed the excess liquid.

In practice a supply of the "slip" is stored in the container 7, and a suitable agitator 15 is operated, to maintain the "slip" in homogeneous condition, ready for introduction to the molds.

The molds 1, 2 are closed molds, having each a relatively small inlet 16 opening into its otherwise closed matrix or cavity 3. The several body portions of the mold—in this case the two body portions 1, 2—are formed of liquid-permeable material, such as plaster of Paris, or fired clay or bisque of fine texture and appreciable porosity. The article to be cast in this case is a saucer, and the cavity 3 of the mold is appropriately shaped. The plane 17 of parting of the separable mold is coincident with the peripheral edge of the article which is cast, and, advantageously, an annular rib 18 is provided on one of the mold body portions and a complementary groove in the other. In assembly the rib 18 nests snugly in the groove, and provides in the parting plane of the mold an encompassing seal about the mold cavity. The rib and groove structure further are valuable in establishing an accurate centering of the two mold bodies.

Preparatory to casting, the mold is secured upon the rotary platen 5; the motor 6 is then energized, rotating the mold at a relatively high speed of between 1000 and 2000 R. P. M., or at a peripheral velocity of about 2600 feet per minute; then the discharge nozzle is introduced into the cavity of the rotating mold, and the feeding of the "slip" is initiated.

The tip 19 of the elongate, slender nozzle 9 is positioned in the mold cavity 3 during the casting, and, advantageously, the tip is bent (as shown in Fig. II), positively to direct the inflowing stream 20 of "slip" angularly to the axis of mold rotation. The "slip" is progressively or continuously fed in such fine stream 20 into the cavity of the rotating mold. Under the impulse of the stream, and due to centrifugal force, the "slip" is caused to flow to the region or regions in the mold cavity most remote from the axis of mold rotation (cf. the reference numeral 21, Fig. II), whence it is caused progressively to build toward the axis of rotation, finally filling the cavity and forming a teat 23 in the inlet passage 16.

The air, which is progressively displaced from the mold by the incharged "slip," is conducted outward, through the passage 16, in streams counter to the confined stream of inflowing "slip." Thus, the tendency for air holes to form in the product is eliminated. As the "slip" progressively enters the cavity 3 and is cast, the excess liquid is progressively abstracted therefrom by the liquid-permeable walls 1, 2 of the mold. The natural effect of the centrifugal force created by rotating the mold is to move the solid ingredients of the "slip" outward, displacing the liquid thereof, and tending to form the liquid in a pool at the center of mold rotation. In forming the mold 1, 2 as a closed mold, the thin, extensive body of "slip" built in the cavity 3 is engaged on opposite sides (above and below in this case) by the liquid-abstracting walls of the mold bodies 1 and 2. The walls of the mold are adapted to filter or abstract all excess liquid from the "slip," whereby the molded body in cavity 3, while still being sufficiently moist to prevent shrinkage, is self-sustaining when the cover or cope of the mold is removed, as shown in Fig. IV. The removal of liquid by the walls of the rotating mold increases decrementally from the radially outward portions of the mold toward the axis of mold rotation, so that no pool of excess liquid forms, as otherwise it might, at the center of the mold cavity. I have found that heat may be applied to the body of the mold, to enhance this so-called decremental abstraction of liquid from the mold cavity, and, as shown in Fig. III, an electric resistance element 22 may be organized with or included in the body of the mold, to provide such application of heat.

The moisture abstracted from the cast "slip" in the mold is in the main the excess moisture, above alluded to. The material remaining in the cavity 3 is moist, but semirigid and self-sustaining upon the mold body 1, when the top 2 is removed.

I have found that the removal of the excess moisture is quickly effected by the porous walls of the rotating closed mold, so that the mold may be removed from the apparatus and opened a moment after the mold cavity has been charged in the manner described. The base 1 of the mold, bearing the molded saucer (Fig. IV), is then placed in or conveyed through the usual drying room. In the drying room the residual moisture in the molded material is removed, causing such material to shrink, and to form a relatively hard, friable article which may be handled and fired in customary manner. The teat 23 is cut away during the usual "fettling" operation which follows the drying process, and the article may then be treated in accordance with customary practice to provide the finished ware.

I claim as my invention:

1. In the production of ceramic-ware, the herein described method of molding which comprises providing a mixture of ceramic material in an excess of liquid, rotating a substantially closed mold at relatively high speed, introducing said fluid mixture to the cavity of said rotating mold and progressively building said mixture (from points more remote from the axis of rotation toward points less remote) into the form of the mold cavity, and, during such building, progressively abstracting liquid from the mixture introduced to said mold cavity.

2. In the production of ceramic-ware, the herein described method of molding which comprises providing a mixture of ceramic material in an excess of liquid, rotating a substantially closed mold at relatively high speed, introducing said fluid mixture to the cavity of said rotating mold and progressively building said mixture (from points more remote from the axis of rotation toward points less remote) into the form of the mold cavity, and while such building progresses drawing liquid from said mixture into the walls of said mold.

3. In the production of ceramic-ware, the herein described method of molding which comprises providing a mixture of ceramic material in an excess of liquid, rotating a substantially closed mold at relatively high speed, introducing said fluid mixture to the cavity of said rotating mold and progressively building said mixture (from points more remote from the axis of rotation toward points less remote) into the form of the mold cavity, and, while such building progresses and for an interval of time after the mold cavity is substantially filled, drawing liquid from said mixture into the walls of said mold.

4. In the production of ceramic-ware, the herein described method of molding which comprises rotating a substantially closed, liquid permeable mold at relatively high speed, introducing "slip" axially into the cavity of said mold and progressively building therein a molded article, while progressively drawing substantially all excess moisture from the "slip" into the walls of said mold in quantities increasing toward the axis of mold rotation.

5. In the production of ceramic-ware, the herein described method of molding which comprises rotating a substantially closed, liquid permeable, a multiple-piece mold at relatively high speed, introducing "slip" axially into the cavity of said mold and progressively building therein a molded article, while progressively drawing in quantities increasing toward the axis of mold rotation substantially all excess moisture from the "slip" into the walls of said mold before parting the mold for removal of the molded article.

6. In the production of seramic-ware, the herein described method of molding which comprises rotating a substantially closed, liquid permeable mold, introducing "slip" through a relatively small inlet extending through the wall of the mold and on the axis of mold rotation and progressively building therein a molded article, while progressively drawing moisture from the so introduced "slip" into the walls of said mold in quantities increasing toward the axis of mold rotation.

7. In the production of ceramic-ware, the herein described method of molding which comprises rotating a substantially closed mold, introducing "slip" through a relatively small inlet extending through the wall of the mold and on the axis of mold rotation, deflecting the inflowing "slip" angularly to the axis of mold rotation and thereby progressively building said "slip" (from points more remote from the axis of rotation toward points less remote) into the form of the mold cavity, and drawing moisture from the molded "slip" into the walls of said mold.

8. In the production of ceramic-ware, the herein described method of molding which comprises rotating a substantially closed, fluid permeable mold at relatively high speed, delivering "slip" into the cavity of said mold and deflecting the inflowing "slip" angularly to the course of its delivery, and through the fluid permeable walls of said mold filtering out moisture from the "slip" in said mold cavity.

9. In the production of ceramic-ware, the herein described method of molding which comprises rotating a substantially closed, liquid permeable mold at relatively high speed, conducting "slip" inward into the cavity of the mold and in counter streams conducting displaced air outward from said cavity, and through the walls of said mold filtering out liquid from the "slip" introduced to said mold cavity.

10. In the production of ceramic-ware, the herein described method of molding which comprises rotating a substantially closed, liquid permeable mold at relatively high speed, conducting "slip" inward into the cavity of the mold and therein positively directing the inflowing "slip" angularly to the axis of mold rotation, and in streams counter to the inflowing "slip" conducting displaced air outward from the mold cavity, and through the walls of said mold filtering out liquid from the "slip" introduced to said mold cavity.

11. In the production of ceramic-ware, the herein described method of molding which comprises rotating a liquid permeable mold at relatively high speed, introducing "slip" into the cavity of said mold, and drawing liquid from the "slip" in said cavity into the body of the mold in quantities increasing decrementally toward the axis of mold rotation.

12. The steps defined in claim 11, and accelerating said removal of liquid from the "slip" by heating the body of said mold.

13. In the production of ceramic-ware, the herein described method of molding which comprises rotating a liquid permeable mold at relatively high speed, introducing "slip" into the cavity of said mold, and drawing liquid from the "slip" in said cavity into the body of the mold, and, by heating the body of the mold, increasing the withdrawal of liquid into the body portions of the mold adjacent the axis of mold rotation, as described.

14. In the production of ceramic-ware, the herein described method which comprises supplying a mixture of ceramic material in an excess of liquid, agitating said supply mixture, rotating a substantially closed, liquid permeable mold, feeding said fluid mixture from said agitated supply and into the cavity of said rotating mold, and drawing liquid from the mixture in said mold cavity into the liquid permeable body of said mold.

15. In apparatus for molding ceramic-ware, the combination of a closed mold formed of a plurality of separable, liquid permeable mold bodies, means for rotating the mold, and means for feeding "slip" into the mold substantially on the axis of mold rotation, and means for deflecting the "slip" in the mold cavity angularly of its axial course of delivery.

16. In apparatus for molding ceramic-ware, the combination of a closed mold formed of a plurality of separable, liquid permeable mold bodies, means for rotating the mold, a container for a supply of "slip", means for maintaining the "slip" in homogeneous condition, and means for feeding the "slip" from said supply container into said mold substantially on the axis of mold rotation, and means for deflecting the "slip" in the mold cavity angularly of said axial course of delivery.

WESLEY B. FLOWER.

Patent No. 2,026,624. January 7, 1936.

WESLEY B. FLOWER.

It is hereby certified that error appears in the printed specification of the above numbered patent requiring correction as follows: Page 3, first column, line 55, claim 5, strike out the article "a" before "multiple-piece"; and that the said Letters Patent should be read with this correction therein that the same may conform to the record of the case in the Patent Office.

Signed and sealed this 11th day of February, A. D. 1936.

Leslie Frazer (Seal)  Acting Commissioner of Patents.